(12) United States Patent
Eastman (10) Patent No.: US 9,010,511 B2
(45) Date of Patent: Apr. 21, 2015

(54) WHEEL DISCONNECT SYSTEM

(71) Applicant: Schaeffler Technologies AG & Co. KG

(72) Inventor: Michael Eastman, Petersburg, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/069,845

(22) Filed: Nov. 1, 2013

(65) Prior Publication Data

US 2014/0054124 A1   Feb. 27, 2014

Related U.S. Application Data

(63) Continuation-in-part of application No. 13/234,677, filed on Sep. 16, 2011, now abandoned.

(60) Provisional application No. 61/384,842, filed on Sep. 21, 2010.

(51) Int. Cl.

| | |
|---|---|
| *F16D 11/14* | (2006.01) |
| *F16D 27/118* | (2006.01) |
| *B60B 27/00* | (2006.01) |
| *B60K 23/08* | (2006.01) |
| *B60K 17/02* | (2006.01) |

(52) U.S. Cl.
CPC ............... *B60B 27/00* (2013.01); *F16D 11/14* (2013.01); *B60K 23/08* (2013.01); *F16D 27/118* (2013.01); *B60K 2023/0858* (2013.01); *B60K 17/02* (2013.01)

(58) Field of Classification Search
USPC ............... 192/69.2, 69.4, 69.41, 69.42, 69.43
See application file for complete search history.

(56) References Cited

U.S. PATENT DOCUMENTS

| | | | | |
|---|---|---|---|---|
| 2,642,970 | A | * | 6/1953 | Szekely .......................... 192/24 |
| 4,195,718 | A | | 4/1980 | Schmohe |
| 4,244,455 | A | * | 1/1981 | Loker .............................. 192/24 |
| 4,557,358 | A | | 12/1985 | Petrak |
| 5,520,272 | A | | 5/1996 | Ewer |
| 5,740,895 | A | | 4/1998 | Bigley |
| 6,109,411 | A | | 8/2000 | Bigley |
| 6,170,628 | B1 | | 1/2001 | Bigley |
| 6,371,268 | B1 | | 4/2002 | McMorris et al. |
| 6,390,221 | B2 | | 5/2002 | Goddard |
| 6,550,594 | B1 | | 4/2003 | Peura |
| 8,225,919 | B2 | | 7/2012 | Harris |
| 2003/0196865 | A1 | | 10/2003 | Lim |
| 2013/0112522 | A1 | * | 5/2013 | Granzow et al. .............. 192/69.9 |

* cited by examiner

*Primary Examiner* — Ramya Burgess
*Assistant Examiner* — Mark Manley
(74) *Attorney, Agent, or Firm* — Lucas & Mercanti, LLP (57) ABSTRACT

An integrated wheel disconnect system is provided, including, a mechanically actuated engagement interlock selector assembly. The engagement interlock selector assembly including a housing, an interlock mechanism disposed in the housing, a spring disposed in the housing, and an actuator assembly, arranged to displace the interlock mechanism towards or away from the spring. The engagement interlock selector assembly is operated by an actuator module, such as a pin, sliding along an external ramp on the interlock mechanism, the mechanism moving axially to selectively engage and disengage the wheel hub from the drive axle.

16 Claims, 7 Drawing Sheets

WHEEL DISCONNECT SYSTEM

CROSS-REFERENCE TO RELATED APPLICATIONS

This application is a Continuation-in-Part of U.S. Ser. No. 13/234,677 filed Sep. 16, 2011, which in turn claims the priority of U.S. 61/384,842 filed Sep. 21, 2010, the priority of both applications is hereby claimed and both applications are incorporated by reference herein.

BACKGROUND OF THE INVENTION

Example aspects herein relate to an integrated wheel disconnect system for a vehicle, and more particularly, to a system which selectively connects or disconnects driving and driven components of the wheel disconnect system to render selected wheels passive or driven.

Four wheel drive vehicles often have either front or rear wheels that have selectively driven or non-driven modes which operate by selectively engaging or disengaging the wheels from an associated drive train. In these four wheel drive systems, typically, a transfer case, coupled to the vehicle transmission, is designed such that it can be engaged or disengaged from the drive train. The engagement of the transfer case with the drive train selectively supplies power to a set of wheels. Although efficiencies can be obtained by solely disengaging the transfer case when not needed, it is known in the art that disengaging the wheels from the drive train improves driving efficiencies dramatically.

Where a transfer case is selectively disengaged from the drive train and the associated wheel set remains engaged, losses may result from the wheels "back driving" the system and having to overcome the rotational moment of inertia of half shafts, axle carrier assemblies, pinion shafts, and associated frictional losses in bearings, seals and gears. Therefore, it is desirable to have a wheel disconnect system that works in concert with the transfer case, engaging when the transfer case is engaged and disengaging when the transfer case disengages. It should be recognized that such wheel end disconnect systems may be used on either the front or rear wheels, depending upon which wheel set has the primary drive function.

Prior art wheel end disconnect systems utilize a vacuum system in order to disengage the wheel spindle from the drivetrain. Typically, such systems include a spindle supported by bearings in a support coupled to a suspension member, having an outer end portion adapted to mount a wheel thereon, and an inner extending portion, disposed towards the center of the vehicle with a radially extending flange that has engaging elements formed, generally on an outer diameter, of the flange. A drive element adapted to rotate under power is mounted adjacent the flange, with an engaging element or clutch slideably mounted thereon, such that it can be selectively moved into and out of engagement with the spindle flange of the wheel. The engaging element or clutch requires an axial force, as previously described, provided by a vacuum system, to disengage from the wheel assembly. Generally, a spring is also provided, that urges the engaging clutch back into engagement once the vacuum has been removed.

An inherent limitation of such a system is that a separate vacuum system must be provided, with associated difficulties in scaling the system properly to provide constant negative pressure.

SUMMARY OF THE INVENTION

In one example embodiment, the system comprises a wheel hub rotatably mounted on a drive axle. A wheel bearing, including an integrally assembled wheel hub is mounted to a vehicle using a suspension member or knuckle arrangement known in the art, the wheel bearing comprising an inner ring, outer ring and rolling elements between the rings. In another embodiment, the wheel bearing may form a separate unitary assembly that is assembled onto an outer diameter of a wheel hub, and fixed onto the assembly by a variety of methods known in the art, including a press fit. An engagement ring with outer engagement elements is mounted on the wheel hub and fixed into position using a variety of methods, including, but not limited to, orbital forming of a wheel hub flange or a nut arrangement. The engagement ring may be fixed against a surface of the inner ring of the wheel bearing.

Engagement elements on the outer diameter of the drive axle are assembled adjacent to and coplanar with the engagement elements of the engagement ring. An engagement interlock selector assembly is mounted on the outer diameter of the drive axle, allowing selective engagement and disengagement of the wheel assembly to the drive axle by sliding an engagement selector element or ring between the engagement elements of the engagement ring fixed to the hub and the engagement elements of the drive axle. The engagement selector ring is selectively moved by actuating an external actuator pin into a ramp mechanism on the outer diameter of the engagement selector ring, the selector ring disengaging the wheel from the drive axle and compressing an associated spring in contact with the selector ring. When the actuator pin is removed, a spring within the engagement interlock selector assembly urges the engagement selector ring into its standard position, either engaging or disengaging the wheel from the drive axle.

A method for operating an integrated wheel end disconnect mechanism, such as described above, also is provided.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner.

Radial spatial descriptions refer to relative diametral positions. For example, the term "radially inwardly" refers to a direction taken from a diametral outer edge towards a central axis of the system or assembly. Conversely, axial spatial descriptions refer to relative axial positions. For example, the term "axially inwardly" refers to a direction taken from an outboard portion of the assembly or system (e.g. wheel bolts 11 in FIG. 1) towards an inboard portion (e.g. drive axle 8 in FIG. 1).

Figure 1:
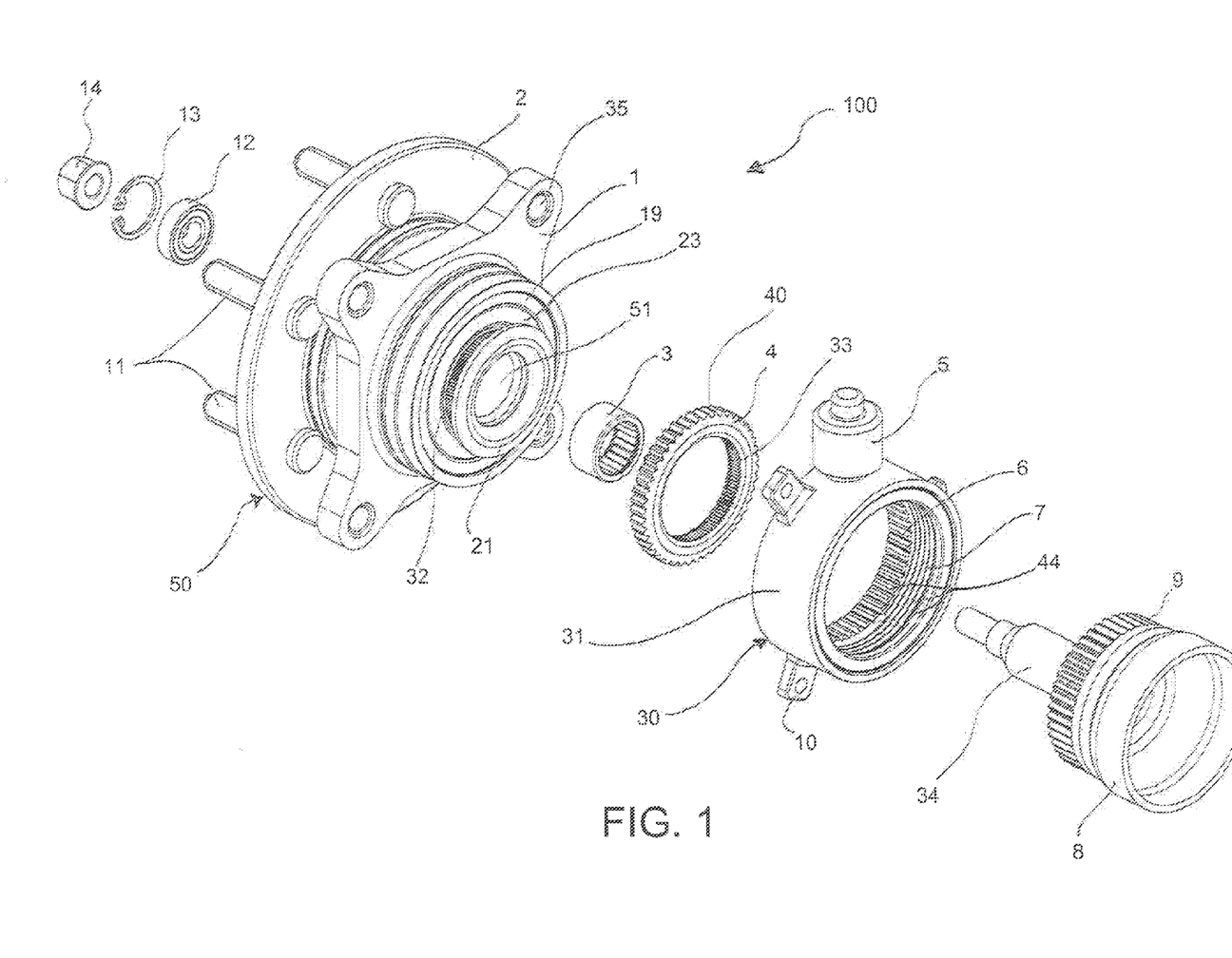
FIG. 1 is an exploded view of the wheel end disconnect assembly or system, according to one example embodiment herein.
Figure 5:
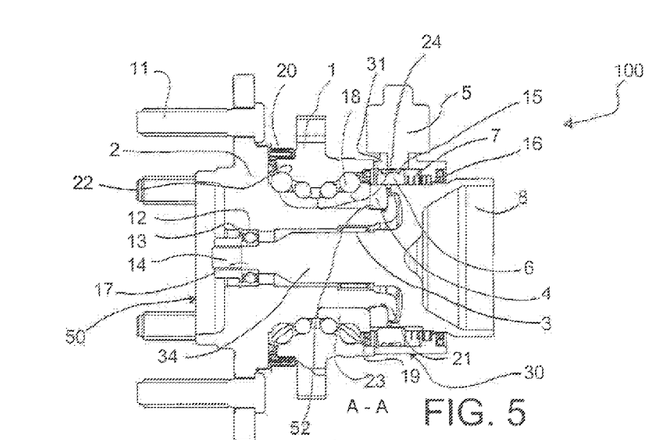
FIG. 5 is a cross sectional view of the wheel end disconnect assembly, taken along line A-A of FIG. 4.

FIG. 1 shows an exploded view of a wheel end disconnect assembly 100 according to an example embodiment herein. Wheel end disconnect assembly 100 comprises wheel bearing 50 rotatably mountable to a vehicle, and rotatably mountable on drive axle shaft 34 of drive axle 8, using outer hub shaft support bearing 12 and inner hub shaft support bearing 3 pressable into an inner diameter of hub 2, and axle drive shaft 34 inserted through the inner diameter of bearings 12 and 3. Referring to FIG. 5, wheel bearing 50, in turn, comprises integrated outer ring 1, having at least one outer race 22 on an inside diameter of outer ring 1, inner ring 23 and hub 2, including at least one inner race 24 on an outside diameter of inner ring 23 and hub 2, and rolling elements 18 disposed between the at least one outer race 22 and the at least one inner race 24. Although wheel bearing 50 is shown as an integrated assembly with hub 2 in FIG. 5 (e.g. having a raceway 24 on an outer diameter of hub 2, and rolling elements between raceway 24 of hub 2 and raceway 22 in outer ring 1), in other embodiments, wheel bearing 50 may form a unitary assembly, separate from and assembled onto hub 2. In the example embodiment in which the wheel bearing forms a separate unitary assembly that is assembled onto an outer diameter of a wheel hub, the wheel bearing may be fixed onto the assembly by a variety of methods known in the art, including a press fit.

Prior to assembly of wheel bearing 50 with drive axle 8, engagement ring 4 is assembled to a radially outer, axially inner surface 52 of hub 2 (see FIG. 5), the assembly accomplished by at least one of a variety of methods known in the art, including without limitation, for example: press fitting, spline engagement or an external nut arrangement. In one embodiment, engagement ring 4 is assembled to hub 2 by slotting ring hub engagement elements 33 into hub ring engagement elements 32, then forming retention element 21 against an inner surface of engagement ring 4. Retention element 21, in one example embodiment, is made by orbital forming an extended flange portion of hub 2 in a radially outward direction, such that the flange contacts the side face of engagement ring 4, thus retaining engagement ring 4 against bearing inner ring 23 (see FIG. 5). Engagement interlock selector assembly 30 can be mounted to a suspension member or knuckle (not shown) of a motor vehicle (not shown) and drive axle 8 can be inserted through the internal diameter of interlock selector assembly 30. C-clip 13 and nut 14 are then assembled onto drive axle shaft 34, and tightened against inner ring face 17 of outer hub shaft support bearing 12 (see FIG. 5). Engagement interlock selector assembly 30, in turn, comprises selector assembly housing 31, actuator 5 assembled through a hole (not shown) in housing 31, an engagement selector ring (also referred to as an interlock mechanism) 6 with inner engagement elements 44, inserted into housing 31, and spring 7 inserted in an opposite end of housing 31 from that in which selector ring 6 is inserted. In one embodiment, actuator 5 is a solenoid. Also shown in FIG. 1 is bearing seal 19.

Figure 2:
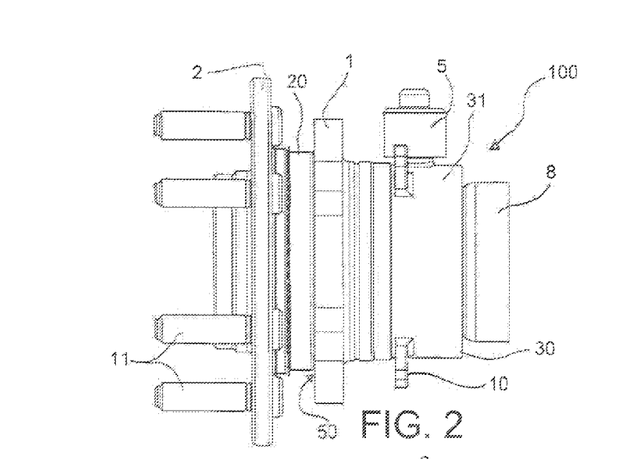
FIG. 2. is a side view of the wheel end disconnect assembly of FIG. 1, in a non-exploded perspective.

FIG. 2 is a side view of wheel end disconnect assembly 100, comprising drive axle 8, inserted through engagement interlock assembly 30 and wheel bearing 50. Outer ring 1, outer bearing seal 20, wheel hub 2 and wheel bolts 11 for assembling wheel bearing 50 to a wheel (not shown), are also shown. Also shown in FIG. 2 are engagement interlock selector assembly 30 comprising selector assembly housing 31, actuator 5 assembled through a hole (see FIG. 11) in housing, 31, and mounting tabs 10 for mounting selector assembly 30 to a suspension member or knuckle (not shown).

Figure 3:
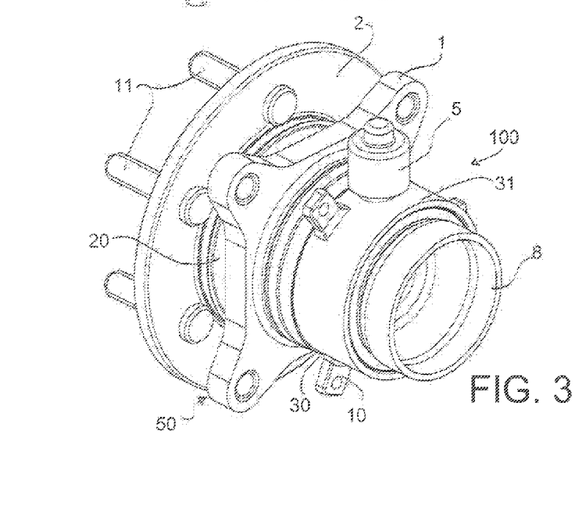
FIG. 3 is a non-exploded perspective view of the wheel end disconnect assembly of FIG. 1.

FIG. 3 is a perspective view of wheel end disconnect assembly 100, comprising drive axle 8, inserted through engagement interlock assembly 30 and wheel bearing 50. Outer ring 1, outer bearing seal 20, wheel hub 2 and wheel bolts 11 of wheel bearing 50 are also shown. Engagement interlock selector assembly also is shown, including selector assembly housing 31, actuator 5, and mounting tabs 10.

Figure 4:
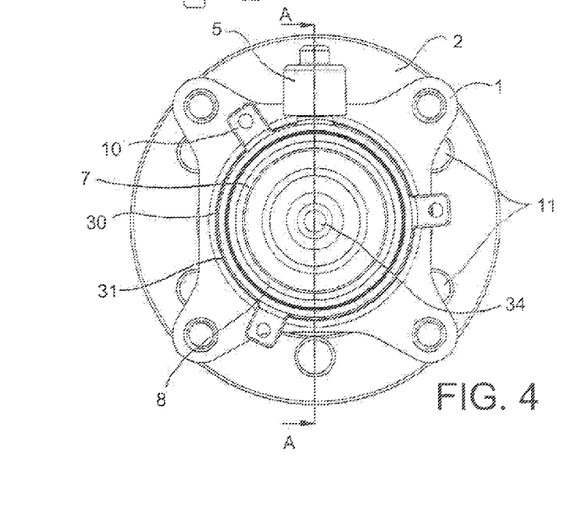
FIG. 4 is a non-exploded front view of the wheel end disconnect assembly of FIG. 1.

FIG. 4 is a front view of wheel end disconnect assembly 100, showing wheel hub 2, outer ring 1, engagement interlock selector assembly 30, wheel bolts 11, and drive axle 8, and a front part of drive axle shaft 34. Engagement interlock selector assembly 30 is also shown, including, selector assembly housing 31, actuator 5, spring 7 and mounting tabs 10.

FIG. 5 is a cross sectional view of wheel end disconnect assembly 100, taken along line A-A of FIG. 4. Wheel bearing 50 is shown, comprising, integrated outer ring 1, wheel hub 2, rolling elements 18, bearing inner ring 23, outer bearing seal 20, bearing seal 19 and wheel bolts 11. In this example embodiment, engagement ring 4 abuts bearing inner ring 23, and a protruding hub flange is formed radially outwardly to form retention element 21. Inner hub shaft support bearing 3 and outer hub shaft support bearing 12 are pressed into an inner diameter of hub 2. Engagement selector assembly 30 is mounted to a suspension member (not shown) using mounting tabs 10 (see FIG. 3). Engagement selector assembly 30, as described above, comprises actuator 5 (including actuator pin 15) inserted through a hole in housing 31, engagement selector ring 6 inserted in one end of housing 31, and spring 7 inserted in another inner end of housing 31. Seal 16 is pressed into an inner recess of housing 31. It should be noted that, in another embodiment, the locations of engagement selector ring 6 and spring 7 may be reversed. Drive axle 8 is then inserted into the inner diameter of hub 2, and c-clip 13 and nut 14 are assembled onto the outer end of drive axle shaft 34. An outer circumferential surface of drive axle 8 is co-planar with or lies in a similar radial position as an outer surface of engagement ring 4, and an inner surface of interlock mechanism 6, such that engagement elements 44 of interlock mechanism 6 may simultaneously mesh with engagement elements 40 of engagement ring 4 and engagement elements 9 of drive axle 8, respectively.

Figure 6:
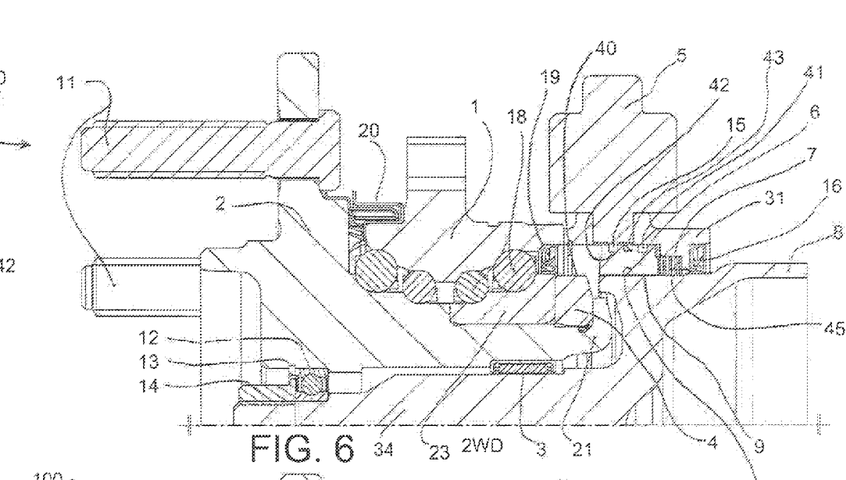
FIG. 6 is a cross sectional view of the wheel end disconnect assembly of FIG. 1, in a disengaged or two wheel drive mode.

FIG. 6 is a cross sectional view of wheel end disconnect assembly 100, taken along line A-A of FIG. 4, showing assembly 100 in a two wheel drive or disconnected mode. The features shown are the same as those in FIG. 5. When the transfer case (not shown) is disconnected from the drivetrain (not shown), a signal from a central control unit (not shown) to actuator 5, causes actuator pin 15 to extend radially inwardly into engagement with selector ring inner slot 41. As a tire (not shown) in contact with the road turns, wheel not shown) and wheel hub 2 rotate, in turn, rotating engagement ring 4, and through contact between engagement ring outer engagement elements 40 and engagement selector ring inner engagement elements 44, rotates engagement selector ring 6. As engagement selector ring 6 rotates, actuator pin 15 enters engagement selector ring ramp 43, moving selector ring 6 axially inwardly as pin 15 slides along the surface ramp 43, compressing spring 7 against an inner face 45 of selector housing 31. As actuator pin 15 enters selector ring outer slot 42, selector ring 6 moves further axially inwardly, further contacting and compressing spring 7, completing its axial movement and disengaging wheel hub 2 from drive axle 8 by eliminating contact between engagement ring outer engagement elements 40 and selector ring inner engagement elements 44, thus eliminating transmission of power from a wheel (not shown) to drive axle 8. Pin 15 maintains selector ring 6 in its disengaged position, resisting the opposing axial force exerted by compressed spring 7 against selector ring 6.

Figure 7:
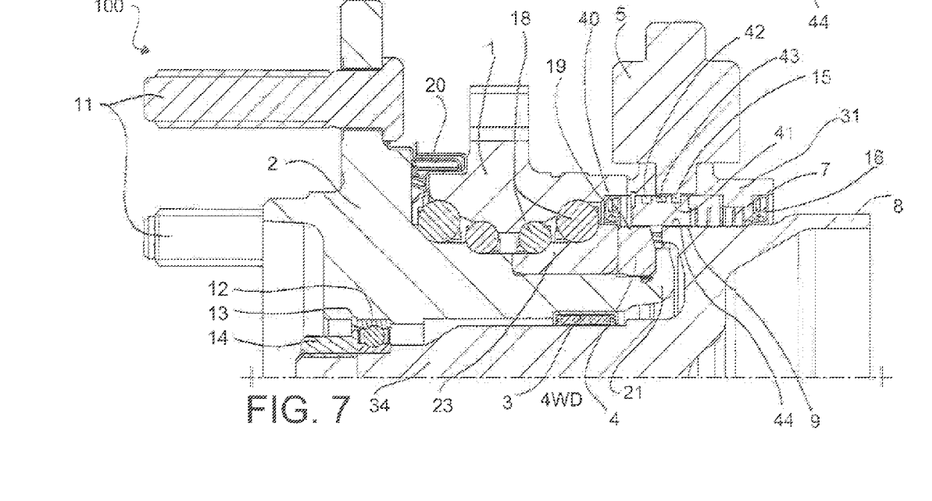
FIG. 7 is a cross sectional view of the wheel end disconnect assembly of FIG. 1 in an engaged or four wheel drive mode.

FIG. 7 is a cross sectional view of wheel end disconnect assembly 100, taken along line A-A of FIG. 4, showing assembly 100 in a four wheel drive or connected mode. The features shown are the same as shown in FIG. 5. Initially, transfer case (not shown) re-connects with the drivetrain (not shown), in turn, causing drive axle 8 to rotate at a given speed. In this mode, a signal is sent from a central control unit (not shown) to actuator 5, causing actuator pin 15 to retract radially outwardly. As pin 15 is retracted, spring 7 is allowed to expand, contacting a side face of selector ring 6 and pushing selector ring 6 axially outwardly, towards wheel hub 2. Selector ring inner engagement elements 44 engage with co-planar engagement ring outer engagement elements 40. As meshing of the engagement elements occurs, power is transmitted through drive axle engagement elements 9 meshed with selector ring engagement elements 44 and into outer engagement elements 40 of ring 4, thus enabling driving of hub 2 and an associated wheel (not shown).

Figure 8:
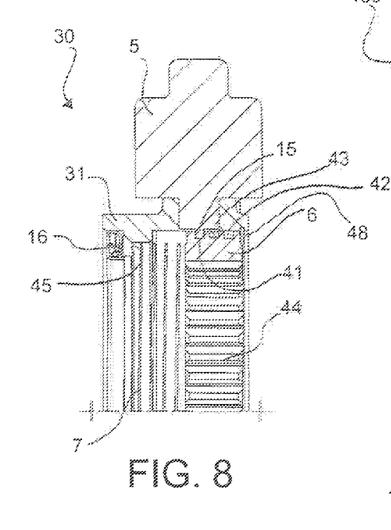
FIG. 8 is a cross sectional view of an engagement interlock selector assembly, which can form part of the assembly of FIG. 1.

FIG. 8 shows a reversed cross sectional view of engagement interlock selector assembly 30. Housing 31, actuator 5, actuator pin 15, spring 7, selector ring 6, selector ring inner slot 41, outer slot 42, ramp 43 and seal 16 are all shown and inner engagement elements 44 are represented. Also, retainer ring 48, used to retain selector ring 6 within assembly 30 is shown.

Figure 9:
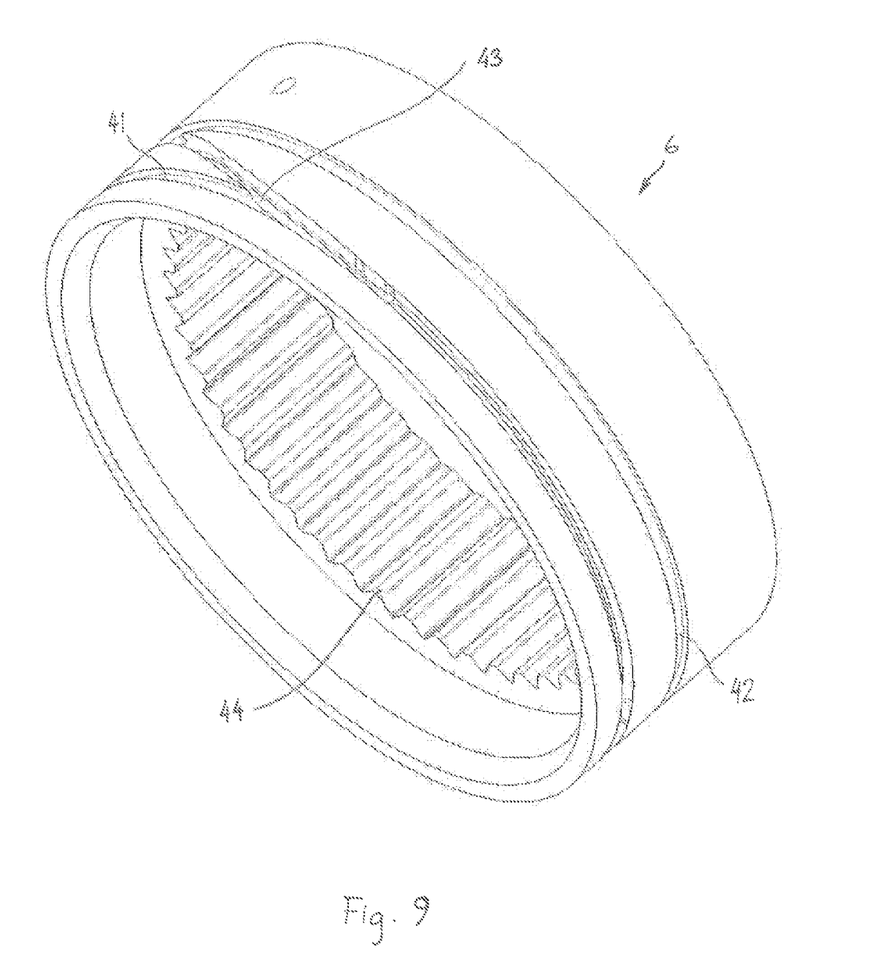
FIG. 9 is a perspective view of an engagement selector ring, which can form part of the engagement interlock selector assembly of FIG. 8.
Figures 10, 11, 12:
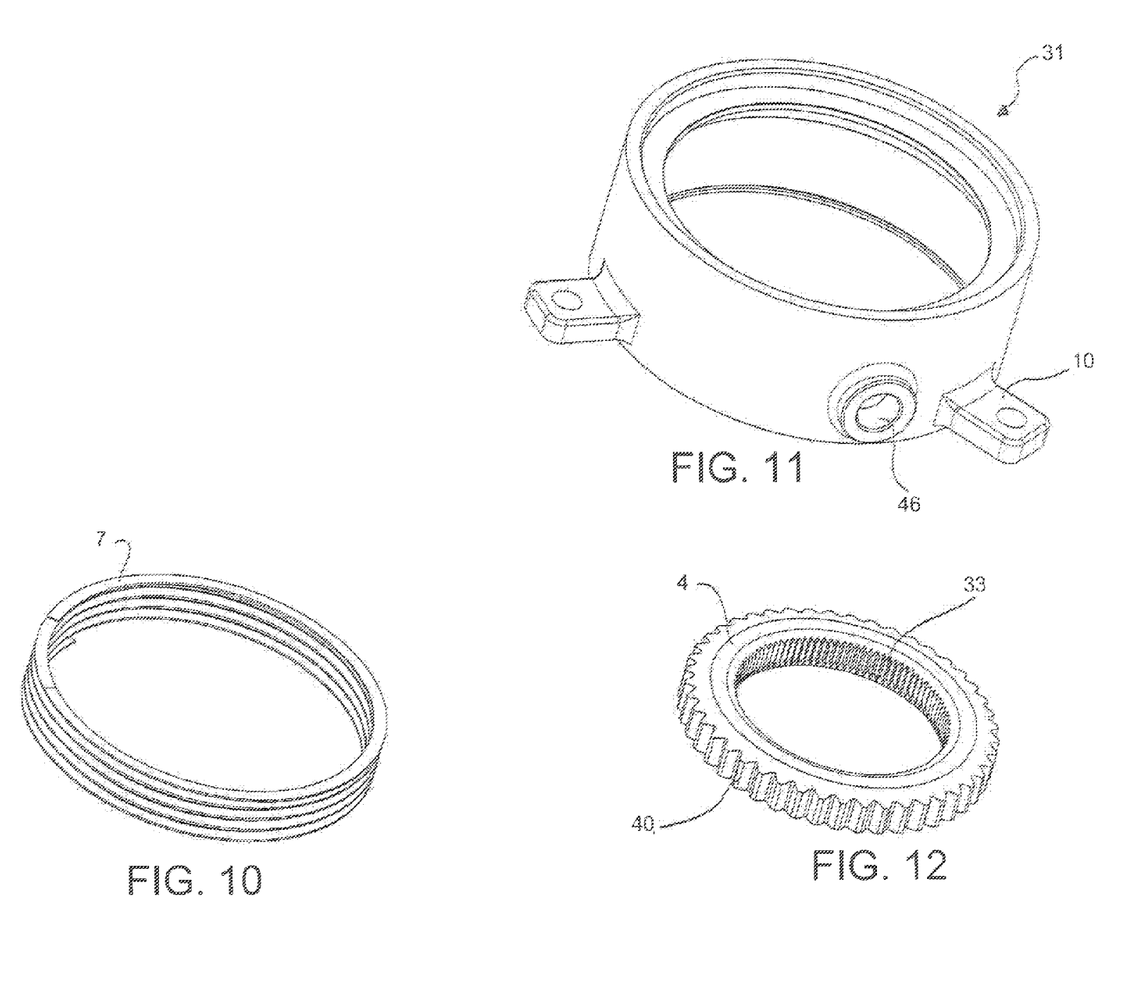
FIG. 10 is a perspective view of a spring, which can form part of the engagement interlock selector assembly of FIG. 8.
FIG. 11 is a perspective view of a selector housing, which can form part of the engagement interlock selector assembly of FIG. 8.
FIG. 12 is a perspective view of an engagement ring, which can form part of the assembly shown in FIG. 1.

FIGS. 9 to 12 show perspective views of individual components of interlock selector assembly 30. FIG. 9 is a perspective view of engagement selector ring 6, and showing inner slot 41, outer slot 42 and ramp 43 thereof. As shown in FIG. 9, the depth of the ramp 43 is greater than that the inner slot 41 and extends into the slot 41. Also shown are inner engagement elements 44. FIG. 10 is a perspective view of spring 7. FIG. 11 is a perspective view of selector assembly housing 31, showing actuator assembly hole 46 and mounting tabs 10. FIG. 12 is a perspective view of engagement ring 4, showing ring hub engagement elements 33 and outer engagement elements 40.

Figure 13:
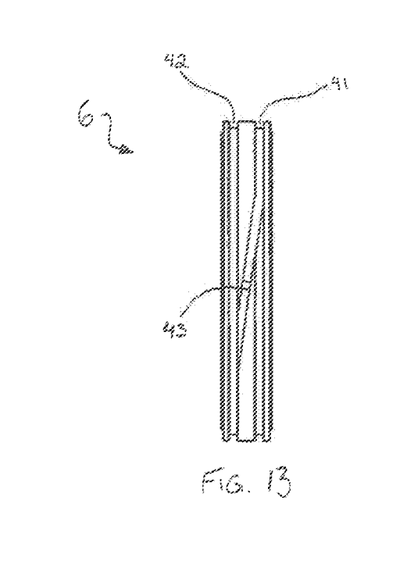
FIG. 13 shows the engagement selector ring of FIG. 9, as viewed from a perspective looking down on a face thereof.
Figure 14:
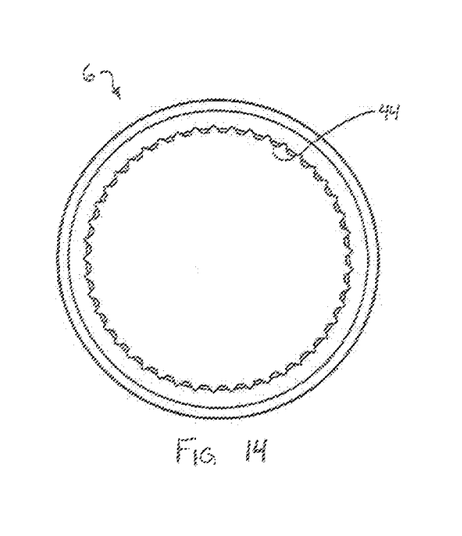
FIG. 14 shows the engagement selector ring of FIG. 9, as viewed from a perspective looking at a side thereof.
Figure 15:
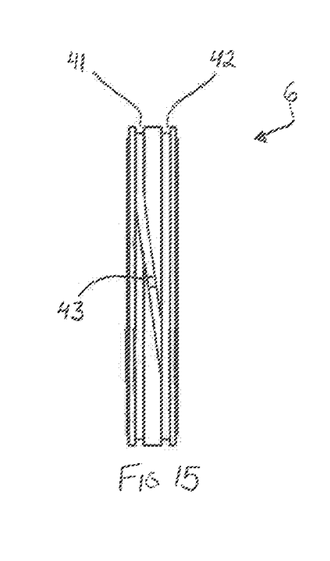
FIG. 15 shows the engagement selector ring of FIG. 9, as viewed from a perspective looking down on another face thereof, which is opposite to the face of FIG. 13.

FIG. 13 shows a face of selector ring 6, showing one or more grooves formed along an outer circumference of ring 6, including inner slot 41, outer slot 42 and ramp 43. FIG. 14 is a view of a side of selector ring 6, showing selector ring inner engagement elements 44. FIG. 15 is a view of a face of ring 6, wherein the face is an opposite face to that of FIG. 13. Ramp 43 provides a connection between slots 41 and 42, and in one example is angled in such a way as to provide a path for pin 15, when pin 15 is extended into engagement therein, to travel from inner slot 41 to outer slot 42, while selector ring 6 is rotating. The ramp 43 extends into slot 41 as shown in FIG. 9 and described above, such that when the selector ring 6 rotates, the pin 15 in inner slot 41 is guided into the ramp 43 and to the outer slot 42.

Figure 16:
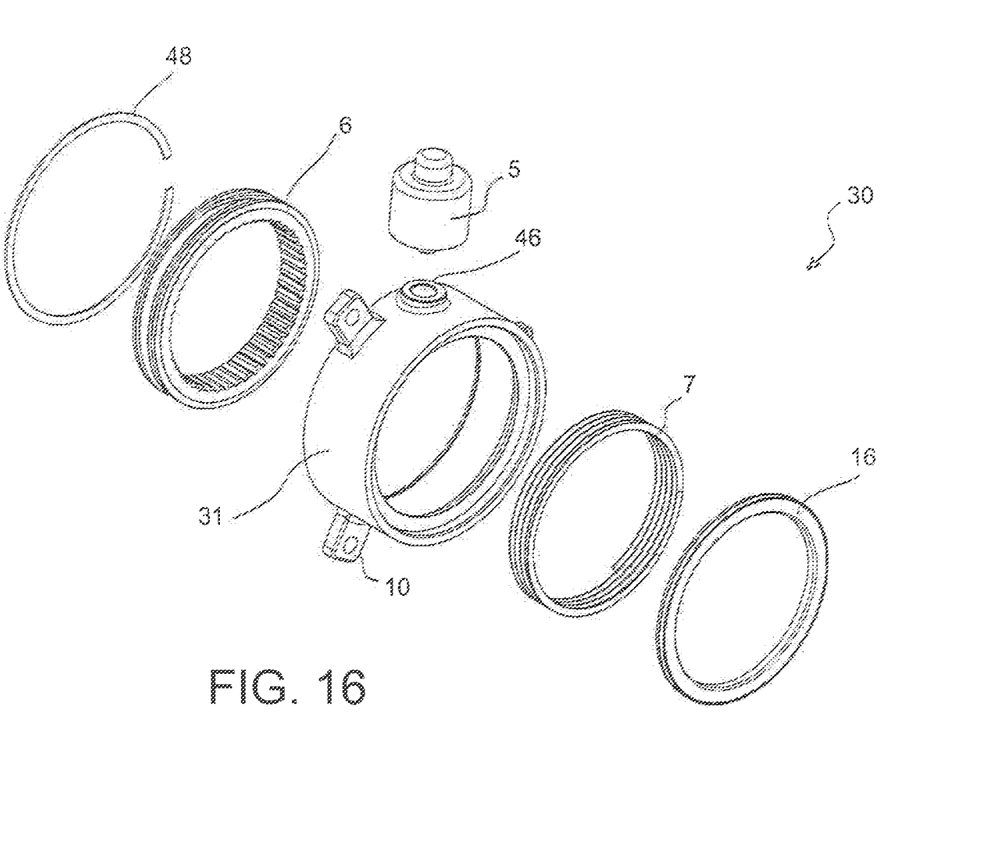
FIG. 16 is an exploded assembly view of the engagement interlock selector assembly of FIG. 8.

FIG. 16 is an exploded assembly view of engagement interlock selector assembly 30 according to an example embodiment herein. Selector housing 31 is shown with mounting tabs 10 and actuator assembly hole 46. Actuator 5 is insertable into actuator assembly hole 46. Spring 7 and engagement selector ring 6 are insertable into housing 31 (e.g. such as at opposite ends of housing 31), and then retainer ring 48 can be inserted into housing 31 to retain selector ring 6 in housing 31. Seal 16 can be inserted into housing 31 on an opposite end from that where retainer ring 48 is inserted, to prevent intrusion of debris and other contaminates into interlock selector assembly 30.

An example of the manner in which engagement and disengagement of a wheel from a drivetrain is performed was described above in view of FIGS. 6 and 7. It is also contemplated in another example embodiment that spring 7 and selector ring 6 may be reversed in position relative to wheel hub 2. In such a configuration, according to one example embodiment herein, engagement of pin 15 into selector ring slots 41 and/or 42 achieves engagement of wheel hub 2 with drive axle 8, rather than disengagement.

Thus, according to an example embodiment herein, a wheel may be disconnected from a drive train using a mechanical actuating device, such as a pin and ramp assembly, not requiring separate vacuum system.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

LIST OF REFERENCE SYMBOLS

1 Integrated Outer Ring
2 Wheel Hub

3 Inner Hub Shaft Support Bearing
4 Engagement Ring
5 Actuator
6 Engagement Selector Ring or Interlock Mechanism
7 Spring
8 Drive Axle
9 Drive Axle Engagement Elements
10 Interlock Selector Assembly Mounting Tabs
11 Wheel Bolts
12 Outer Hub Shaft Support Bearing
13 C-Clip
14 Nut
15 Actuator Pin
16 Seal
17 Outer Hub Shaft Support Bearing Inner Ring Face
18 Rolling Elements
18 Bearing Seal
20 Outer Bearing Seal
21 Retention Element
22 Outer Race
23 Bearing inner Ring
24 Inner Race
30 Engagement interlock Selector Assembly
31 Selector Assembly Housing
32 Hub Ring Engagement Elements
33 Ring Hub Engagement Elements
34 Drive Axle Shaft
35 Knuckle Mounting Holes
40 Engagement Ring Outer Engagement Elements
41 Engagement Selector Ring Inner Slot
42 Engagement Selector Ring Outer Slot
43 Engagement Selector Ring Ramp
44 Engagement Selector Ring Inner Engagement Elements
45 Housing Spring Inner Face
46 Actuator Assembly Hole
48 Retainer Ring
50 Wheel Bearing
51 Wheel Bearing Inner Diameter
52 Hub Inner Surface
100 Wheel End Disconnect Assembly

What we claim is:

1. A wheel end disconnect system for a vehicle, comprising:
   a drive axle;
   a wheel hub rotatably mounted on said drive axle;
   an engagement component mounted to said wheel hub;
   an interlock selector assembly, including an engagement selector element, controllably displaceable between an engaged position in which the engagement selector element engages said wheel hub to said drive axle and a disengaged position in which the engagement selector element disengages said wheel hub from said drive axle, the engagement selector element having two slots including a first ring-shaped slot and a second ring-shaped slot connected by a ramp that is helical-shaped and extends into at least one of the inner ring-shaped slot and the outer ring-shaped slot;
   an actuator having a pin selectively engageable in one of the two slots in the engagement selector element, the two slots and the ramp being configured so that when the engagement selector element is in one of the engaged position and the disengaged position and the actuator is actuated so that the pin enters one of the two slots, rotation of the engagement selector element causes the pin to slide along the ramp and move the engagement selector element into an other of the engaged position and the disengaged position.

2. The wheel end disconnect system of claim 1, wherein said drive axle includes engagement elements on its outer circumferential surface.

3. The wheel end disconnect system of claim 1, wherein said engagement selector element includes engagement elements on its inner circumferential surface.

4. The wheel end disconnect system of claim 1, wherein the slots are arranged on an outer circumferential surface of the engagement selector element.

5. The wheel end disconnect system of claim 1, further comprising a spring biased against the engagement selector element.

6. The wheel end disconnect system of claim 1, wherein said interlock selector assembly also includes a housing in which said engagement selector element is slideably disposed.

7. The wheel end disconnect system of claim 1, wherein said engagement component includes engagement elements on at least one of its outer circumferential surface and its inner circumferential surface.

8. The wheel end disconnect system of claim 1, wherein said hub includes a flange formed to retain said engagement component.

9. The wheel end disconnect system of claim 1, wherein at least one surface of said engagement component and at least one surface of said drive axle are co-planar with at least one surface of said engagement selector element.

10. An engagement interlock selector assembly for a wheel system, comprising:
    a housing;
    an interlock mechanism disposed in the housing and movable between an engaged position and a disengaged position, the interlock mechanism engaging an engagement component of a wheel hub in the engaged position, the interlock mechanism having two slots including a first ring-shaped slot and a second ring-shaped slot connected by a ramp that is helical-shaped and extends into at least one of the first ring-shaped slot and the second ring-shaped slot;
    a spring disposed in the housing, the spring having an urgency biased against the interlock mechanism and urging the interlock mechanism toward one of the engaged position and the disengaged position;
    an actuator assembly having a pin selectively engageable in one of the two slots in the interlock mechanism, the two slots and the ramp being configured so that when the interlock mechanism is in one of the engaged position and the disengaged position, and the actuator is actuated so that the pin enters one of the slots, rotation of the interlock mechanism causes the pin to slide along the ramp and move the interlock mechanism into an other of the engaged position and the disengaged position against the urgency of the spring.

11. The engagement interlock selector assembly of claim 10, wherein the interlock mechanism forms a ring that includes engagement elements on its inner circumferential surface.

12. The engagement interlock selector assembly of claim 10, wherein said actuator assembly is a solenoid.

13. A method of operating a wheel end disconnect assembly, the wheel end disconnect assembly comprising:
    a drive axle;
    a wheel hub rotatably mounted on said drive axle;
    an engagement component mounted to said wheel hub;
    an interlock selector assembly, including an engagement selector element, controllably displaceable between an engaged position in which the engagement selector element engages said wheel hub to said drive axle and a disengaged position in which the engagement selector element disengages said wheel hub from said drive axle, the engagement selector element having two slots including a first ring-shaped slot and a second ring-shaped slot connected by a ramp that is helical-shaped and extends into at least one of the first ring-shaped slot and the second ring-shaped slot; and an actuator having a pin selectively engageable in one of the two slots in the engagement selector element, the method comprising:

rotating the engagement selector element; and selectively engaging an actuator with at least one of the two slots in the engagement selector device during rotation of the engagement selector device, to cause the engagement selector device to move axially, and selectively engage or disengage a wheel hub from a drive axle.

14. The method of claim 13, wherein axial movement of the engagement selector device includes sliding the engagement selector device into a co-planer position with the drive axle and the engagement component on the wheel hub.

15. The method of claim 13, wherein axial movement of the engagement selector device brings it out of contact with at least one of an associated drive axle and the engagement component on the wheel hub.

16. The wheel end disconnect system of claim 1, wherein the engagement selector element has an inner axial side facing the drive axle and an outer axial side facing the wheel hub, the first ring-shaped slot being proximate the inner axial side and the second ring-shaped slot being proximate the outer axial side.

\* \* \* \* \*